(12) United States Patent  (10) Patent No.: US 6,595,081 B2
Schütt  (45) Date of Patent: Jul. 22, 2003

(54) DRIVE FOR A DISPLACEABLE MOTOR VEHICLE PART

(75) Inventor: Thomas Schütt, Fürstenfeldbruck (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/809,632

(22) Filed: Mar. 16, 2001

(65) Prior Publication Data

US 2001/0035062 A1 Nov. 1, 2001

(30) Foreign Application Priority Data

Mar. 16, 2000 (DE) .......................... 100 12 723

(51) Int. Cl.[7] ................................................. G05G 1/00
(52) U.S. Cl. ........................................................ 74/503
(58) Field of Search .............................. 74/503, 502.5, 74/502.6, 501.6; 296/223, 229

(56) References Cited

U.S. PATENT DOCUMENTS

| 3,874,722 | A | * | 4/1975 | Pickles | ........................ | 296/223 |
| 4,272,125 | A | * | 6/1981 | Bienert et al. | .............. | 74/502.6 |
| 4,317,505 | A | * | 3/1982 | Schneider | ................... | 74/502.5 |
| 4,531,777 | A | * | 7/1985 | Bienert et al. | .............. | 296/223 |
| 4,919,005 | A | * | 4/1990 | Schleicher | ................. | 74/502.6 |
| 5,746,090 | A | * | 5/1998 | Boss et al. | ................. | 74/502.6 |

FOREIGN PATENT DOCUMENTS

| DE | 43 13 687 C2 | 11/1994 |
| DE | 197 34 815 C1 | 6/1998 |

* cited by examiner

Primary Examiner—Christopher P. Schwartz
Assistant Examiner—Melanie Torres
(74) Attorney, Agent, or Firm—Nixon Peabody LLP; David S. Safran

(57) ABSTRACT

A drive for a displaceable motor vehicle part which comprises at least one drive cable (22, 24) and a driven output pinion (12). The output pinion (12) drives a drive unit (14, 16; 114, 115, 116, 117) which engages the drive cable or cables (22, 24) at least at two points in order to drive it or them.

15 Claims, 6 Drawing Sheets

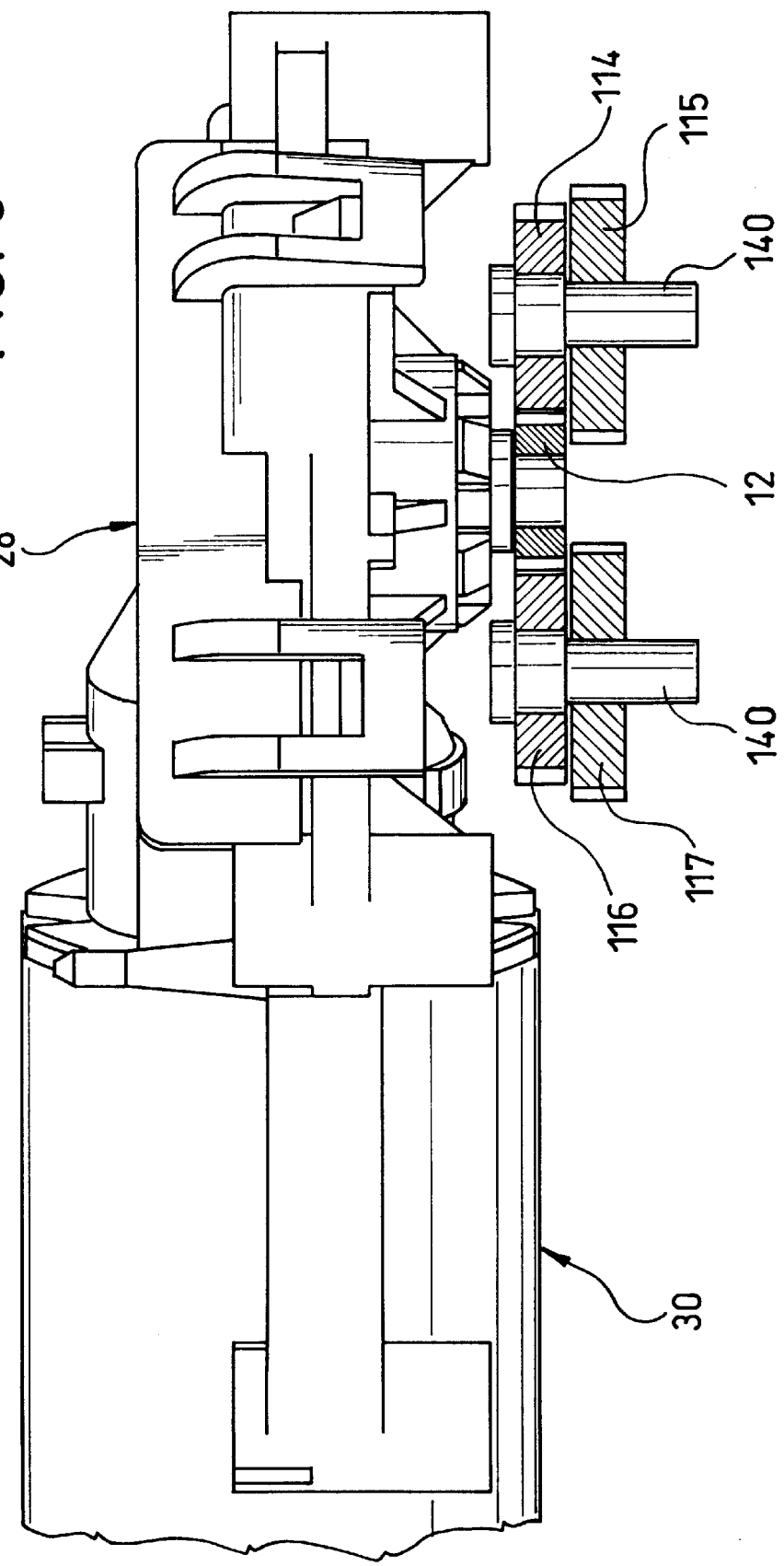

DRIVE FOR A DISPLACEABLE MOTOR VEHICLE PART

BACKGROUND OF THE INVENTION

1. Field of the Invention

This invention relates to a drive for a displaceable motor vehicle part, especially the cover element of an openable motor vehicle roof which comprises at least one drive cable and one driven output pinion.

2. Description of Related Art

Drives of the above mentioned type are widely used, for example, for covers of sliding roofs and the like, generally, the output pinion being driven by an electric motor via a stepdown gear and being made as a gear wheel which is located between two parallel drive cables made as ascending cables, and which drives the cables in opposite directions by direct engagement at one point of each cable at any given time, see for example, German Patent No. DE43 13687C2.

Furthermore, for example, German Patent No. DE 197 34 815 C1 discloses tandem drives for adjustable motor vehicle roof elements, in which there are two separate output pinions which are each driven by its own electric motor via its own step-down gear, and are directly engaged to two drive cables between them in order to drive them in opposite directions by engagement at one point of each cable at any given time. In this arrangement, the force is applied to each of the two drive cables at two successive points; however, for this purpose, there are two separate drives, and this represents high cost.

These known drives are disadvantageous in that, when high torque is applied to the output pinion, the point at which the force is applied to the respective drive cable is highly loaded, and this can lead to cable-side or pinion-side rupture.

SUMMARY OF THE INVENTION

The primary object of the present invention is to devise a drive for an displaceable motor vehicle part, such as a sunroof cover panel, which enables forces to be applied by the output pinion to the drive cable or cables which are higher possible with the prior art.

This object is achieved in accordance with the invention by a drive in which the output pinion is in driving engagement with a drive unit which, in turn, is in driving engagement with the at least one drive cable at least at two points. In this approach, it is advantageous that the drive force made available by the output pinion is applied to the drive cable or cables at least at two points so that the individual point of force application, as compared to known drives in which the force is applied to the drive cable at only one point at a time, is greatly reduced, generally at least cut in half.

Preferably, the drive unit comprises at least two wheels which each engage the drive cable or cables, and it is made as a gear reducer for rotation of the output pinion, it being possible for the wheels to be made as gear wheels and the drive cable or cables as threaded cables.

In the first embodiment, the drive unit comprises a total of two wheels which directly engage the output pinion, the output pinion engaging the teeth of the wheels and the output pinion and the wheels lying essentially in one plane. The diameter or the number of teeth of the two wheels can be slightly different, the diameter or the number of teeth of the output pinion for purposes of gear reduction preferably being less than for the wheels. In this embodiment the simple version is advantageous.

In one alternative embodiment, the drive unit is made such that the wheels which engage the cables are driven via gearing by the output pinion, the latter being made preferably such that the drive unit has two wheels which engage the cables and two wheels which are coaxial thereto and which are connected so as to rotate together, and which each directly engage the output pinion. In this embodiment, it is advantageous that the corresponding configuration of the individual wheels enable stronger gear reduction than in the first embodiment.

In the following, two embodiments of the invention are explained in detail, by way of example, using the attached drawings.

BRIEF DESCRIPTION OF THE DRAWINGS

FIG. 8 is a side view of the drive of FIG. 6, together with the motor and the step-down gear unit for the output pinion.

DETAILED DESCRIPTION OF THE INVENTION

Figure 1:
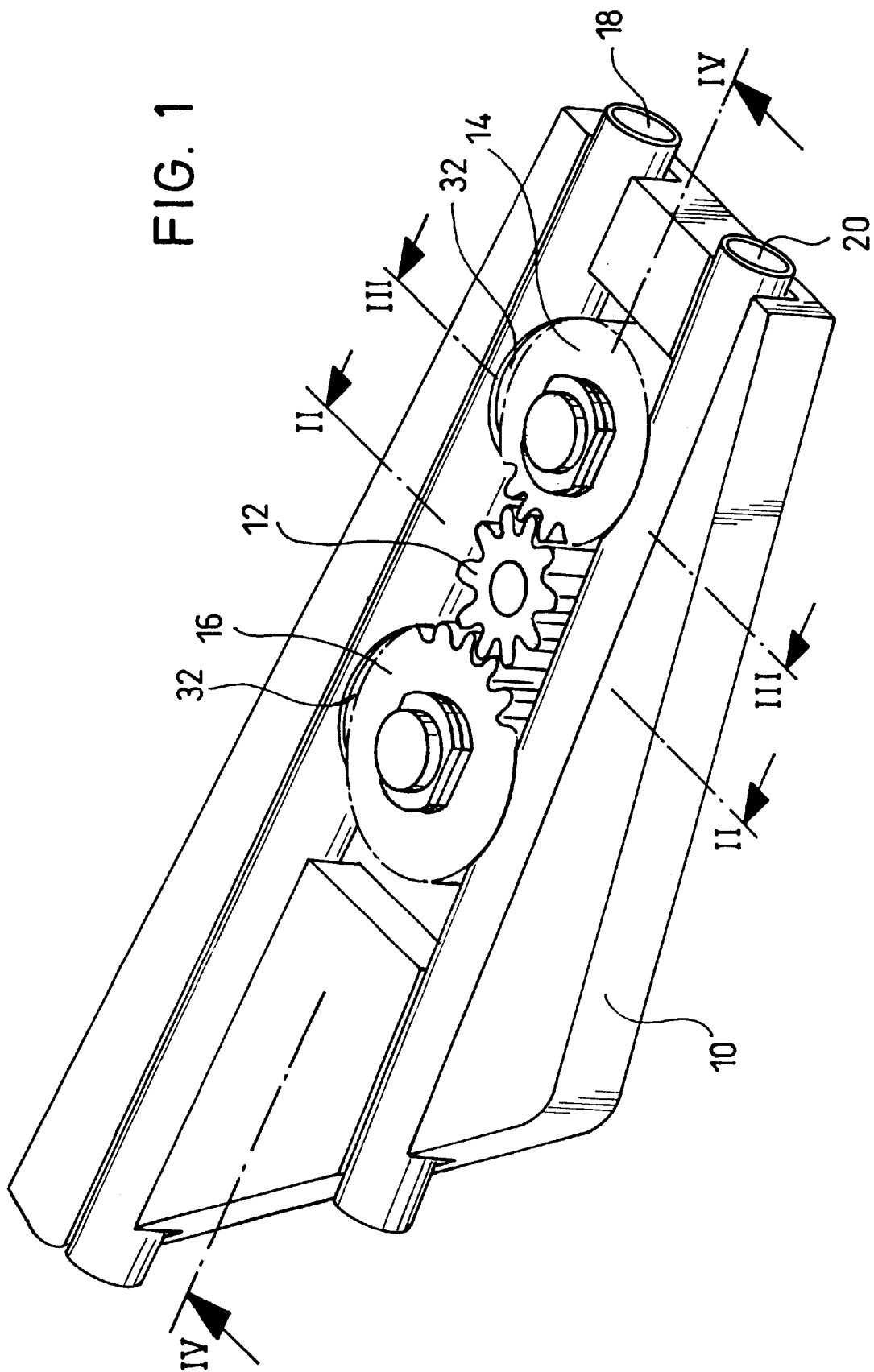
FIG. 1 is a schematic perspective view of a first embodiment of a drive in accordance with the invention.
Figure 2:
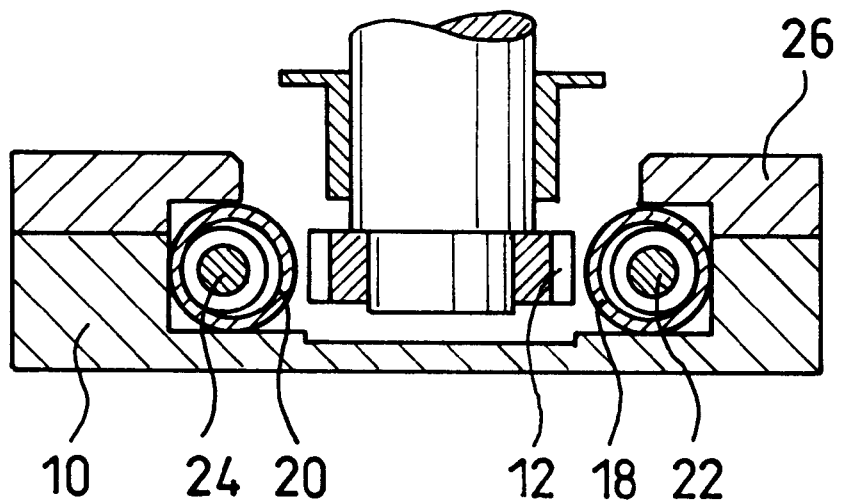
FIG. 2 shows a section taken along line II—II in FIG. 1.
Figure 3:
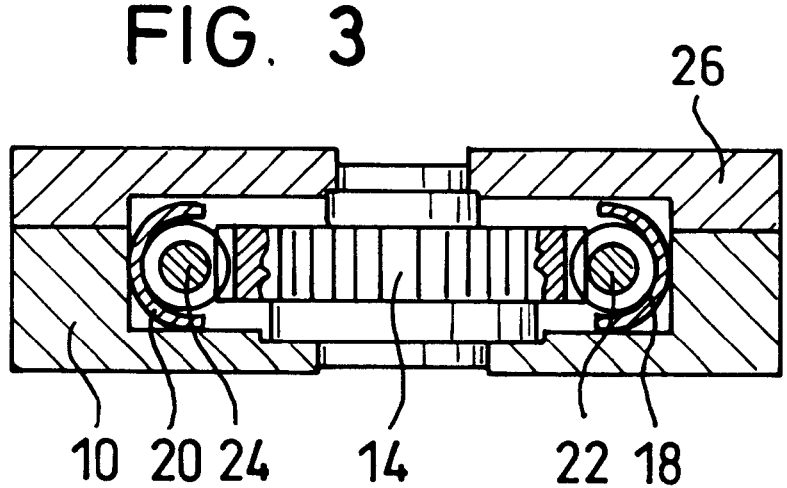
FIG. 3 shows a section taken along line III—III in FIG. 1.
Figure 4:
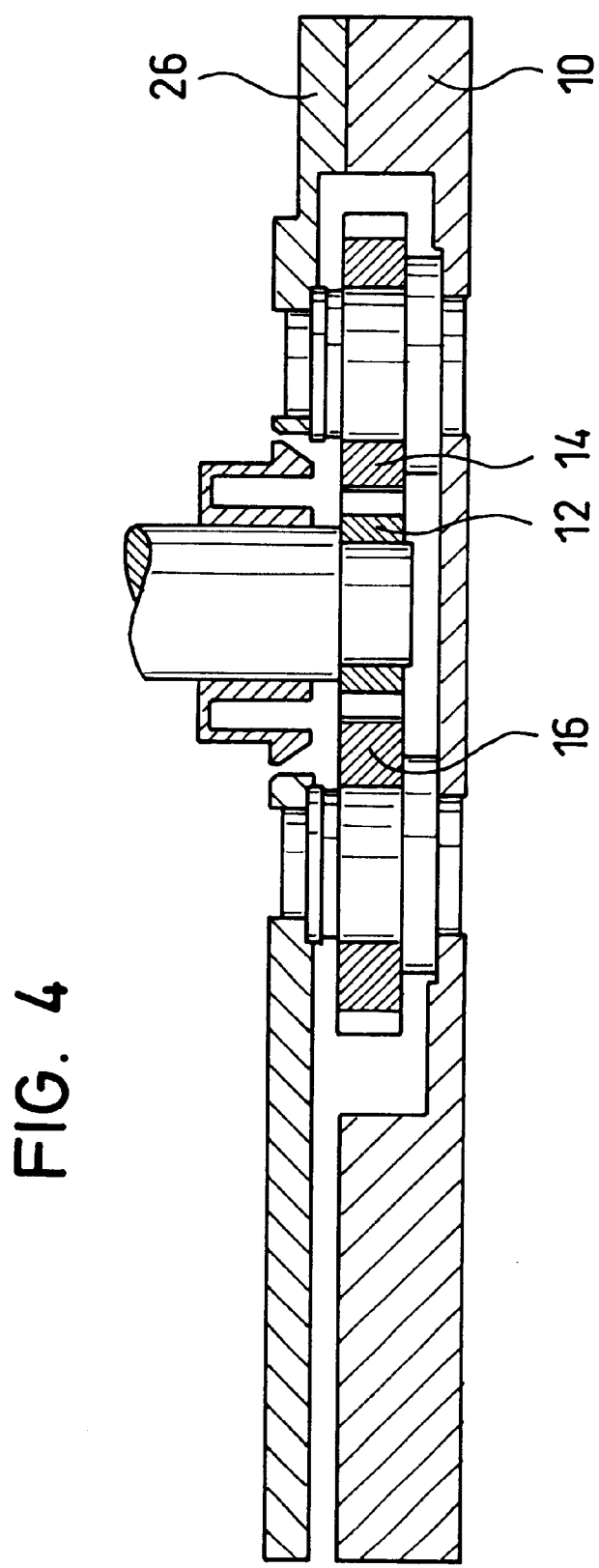
FIG. 4 shows a section taken along line IV—IV of FIG. 1.
Figure 5:
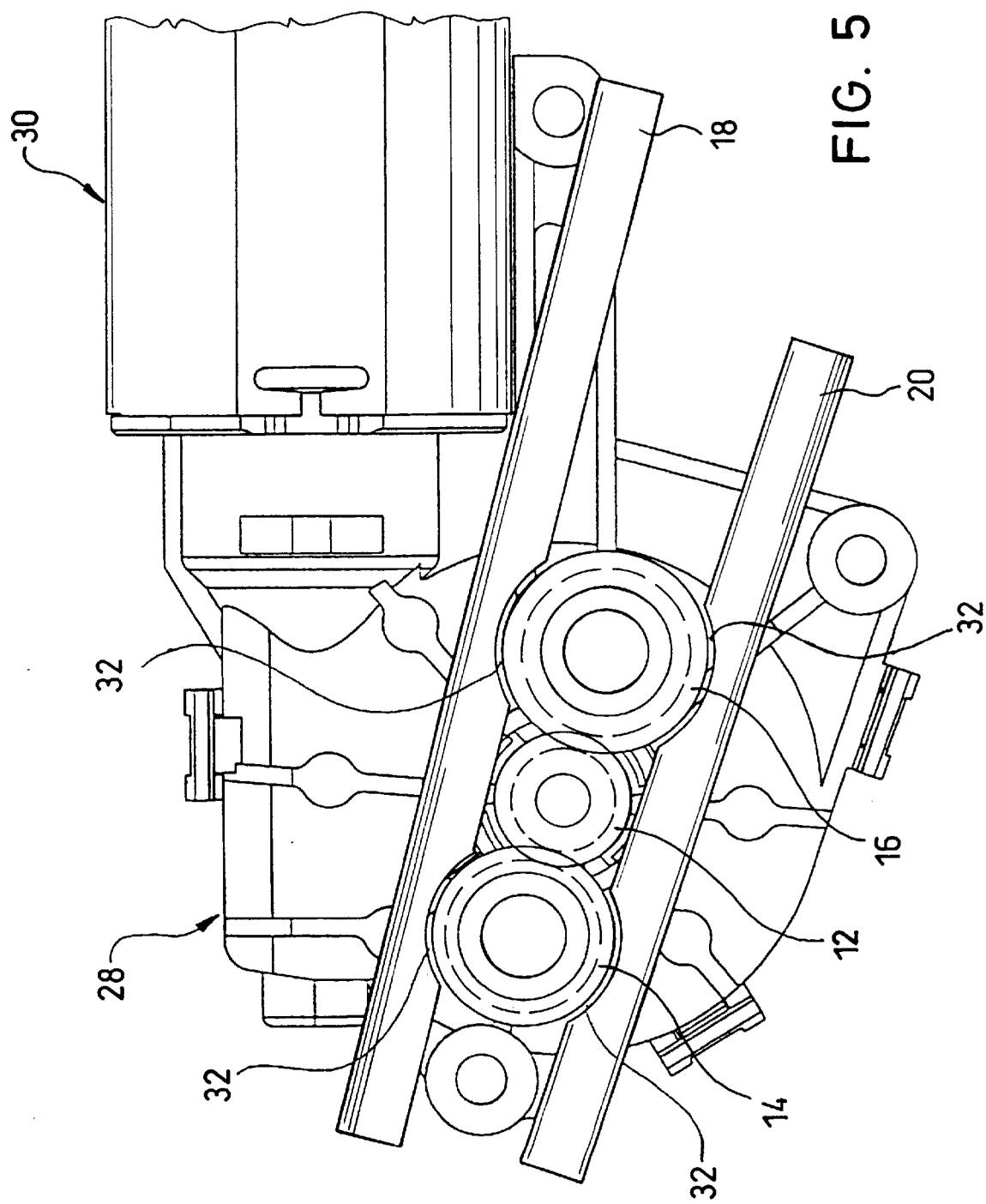
FIG. 5 is a plan view of the drive of FIG. 1, together with the motor and the gearing for the output pinion.

FIGS. 1 to 5 schematically show a first embodiment of a drive for an adjustable motor vehicle part, preferably a cover panel or another element of an openable motor vehicle roof, for example, the cover of a sliding roof or sliding and lifting roof or a louver of a louvered roof. In a roof-mounted frame 10, there are an output pinion 12, two gear wheels 14, 16 and two guide tubes 18, 20 which guide two helical or splined cables 22, 24, a respective end of each of which is attached to the displaceable cover, etc. Furthermore, the roof frame part 10 is provided with a bearing cover 26 which has been omitted from FIG. 1, but which is shown in FIGS. 2–4. As shown in FIG. 5, the output pinion 12 is driven in a conventional manner by a worm wheel of a worm gear pair 28, the worm wheel engaging a worm shaft provided on the front end of the shaft of an electric drive motor 30 so that the rotation of the output pinion 12 with respect to rotation of the motor shaft is highly stepped down.

The axes of rotation or the bearing axes of the gear wheels 14, 16 and of the pinion 12 are located on a line, the gears 14, 16 and the output pinion 12 being located between the two guide tubes 18, 20, and thus, the drive cables 22, 24. The guide tubes 18, 20 are provided with openings 32, via which the gear wheels 14, 16 are able to engage the threads or splines of the guide cables 22, 24, each individual one of the gear wheels 14, 16 engaging each of the cables 22 and 24 at exactly one site. The output pinion 12 is located in the same tooth plane as the gear wheels 14, 16 and its teeth engage the gear wheels 14, 16 so that rotation of the output pinion 12 in one direction causes synchronous rotation of the gear wheels 14, 16. The rotation of the gear wheels 14, 16, in turn, applies the torque transmitted by the output pinion as drive force to the drive cables 22, 24, which are thus driven in opposite directions, the force being applied to each of the two drive cables at two points, specifically, the engagement point of the gear wheel 14 and the engagement point of the gear wheel 16. Thus, overall, at a given torque of the output pinion 12, the stress on each individual point of force application to the drive cables 22, 24 is essentially cut in half as compared to the prior art in which the torque of the output pinion acts directly on the drive cable.

In this invention the output pinion 12 does not engage the drive cables 22, 24. The diameter or the number of teeth of the output pinion 12 is less than in the gear wheels 14, 16 so that compared to direct application of force by the output pinion to the drive cables, a step-down occurs. The number of teeth of the gear wheels 14, 16 can be chosen to be slightly different, resulting in a not exactly parallel position of the guide tubes 18, 20 and the drive cables 22, 24. For example, the following numbers of teeth for the gear wheel 14, the pinion 12 and the gear wheel 16 can be chosen: 22/16/25 and 23/15/26. Theoretically, the same number of teeth is also possible.

The major advantage of the embodiment shown in FIGS. 1 to 5 with direct engagement of the gear wheels 14, 16, which are driven by the output pinion 12, with the drive cables 22, 24 is that the number of necessary components and the installation space required are small in the vertical/heightwise direction. However, since the teeth of the gear wheels 14, 16 must be suitable both for engaging the cables 22, 24 and also the teeth of the output pinion 12, the choice of the type of toothing is not free. Thus, for example, an involute toothing is not possible.

Figure 6:
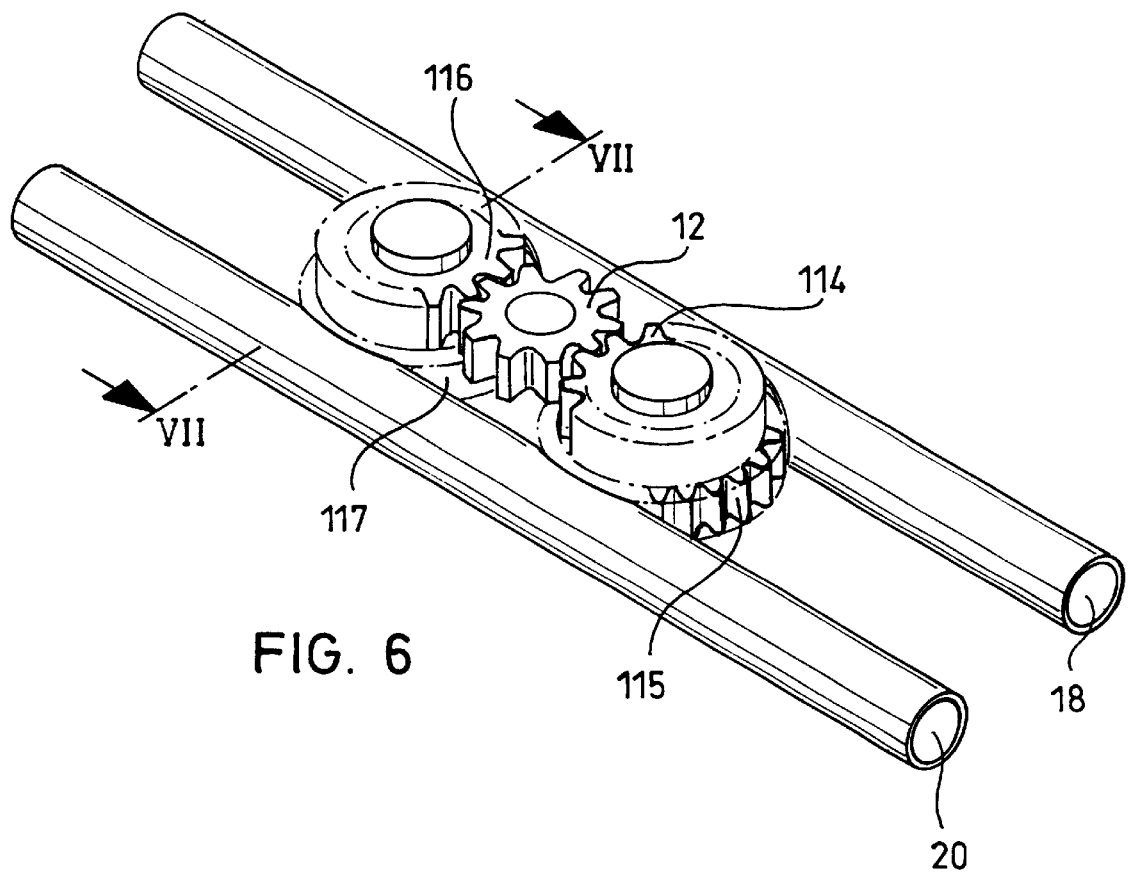
FIG. 6 is a view similar to that of FIG. 1, but showing a second embodiment of the invention.
Figure 7:
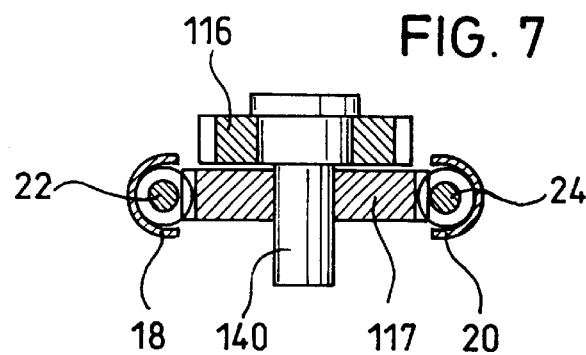
FIG. 7 shows a section taken along line VII—VII of FIG. 6.

The alternative embodiment shown in FIGS. 6 to 8 differs from the embodiment described previously with direct engagement, essentially in that the two gear wheels 115, 117 which are engaged with the drive cables 22, 24 are not driven directly, i.e., in the same tooth plane, by the output pinion 12, but instead, for this purpose, there is an additional gear wheel (primary wheel) 114, 116 for each which directly engages the output pinion 12. The additional gear wheel 114, 116 coaxially mounted relative to the respective gear wheel 115, 117 so as to rotate together with the respective gear wheel (secondary wheel) 115, 117 in order to drive it. For this purpose, there is a common shaft 140 on which each pair of gear wheels 114, 115 and 116, 117 is fixed.

When the diameter and the number of teeth of the primary wheels 114, 116 which engage the output pinion 12 are chosen to be greater than on the corresponding secondary wheels 115, 117, provisions can be made for additional step-down of the rotation of the output pinion 12. Another major advantage of this embodiment is that the toothing of the secondary wheels 115, 117 which engage the drive cables 22, 24, and of the primary wheels 114, 116 which engage the output pinion 12, can be chosen to be different, and thus, can be optimized with respect to the respective engagement objective. In particular, involute toothing is also possible. One disadvantage of this embodiment, as compared to the embodiment described first, is a larger amount of installation space is required in the vertical/heightwise direction, and in the use of additional components (two additional gear wheels).

Overall, this invention offers the major advantage that, for the transmission of a given torque of the output pinion to the drive cable, by providing at least two points of force application for each cable, the stress at the force application points is greatly reduced as compared to the prior art in which there is only one force application point per cable; this on the one hand, increases the reliability of the drive, and on the other, enables use for roof systems in which very high drive forces must be transmitted, for example, in large roof system for convertibles.

What is claimed is:

1. Drive for a displaceable motor vehicle part, comprising at least one drive cable and a driven output pinion, the output pinion being in driving engagement with a drive unit which is in driving engagement with the at least one drive cable at least at two points, wherein the drive unit comprise at least two wheels, each of which is driven by the output pinion and which is in direct driving engagement with the at least one drive cable so that the drive cable is directly driven by said two wheels.

2. Drive as claimed in claim 1, wherein the drive unit comprises at least two wheels which each engage the at least one drive cable.

3. Drive as claimed in claim 1, wherein the drive unit is a gear reducer for rotation of the output pinion.

4. Drive as claimed in claim 1, wherein the wheels are gear wheels and the at least one drive cable is threaded or splined for being engaged by teeth of the gear wheels.

5. Drive as claimed in claim 4, wherein the drive unit comprises two wheels engage the at least one drive cable and the output pinion directly; and wherein the output pinion engages the teeth of the gear wheels to drive them, the wheels and the output pinion lying essentially in a common plane.

6. Drive as claimed in claim 5, wherein the diameter and the number of teeth of the two wheels are different.

7. Drive as claimed in claim 6, wherein the diameter and the number of teeth of the output pinion are less than for the wheels.

8. Drive as claimed in claim 1, wherein the drive unit further comprises a gearing driven by the output pinion and which drivingly engages the wheels which engage the at least one drive cable.

9. Drive as claimed in claim 8, wherein the gearing of the drive unit comprises two gear wheels which are located coaxial to the two wheels which engage the at least one drive cable and are connected to rotate therewith; and wherein each of the gear wheels directly engages the output pinion.

10. Drive as claimed in claim 9, wherein the two wheels which engage the at least one drive cable have a diameter and number of teeth which are different from that of the gear wheels which engage the output pinion.

11. Drive as claimed in claim 10, wherein the diameter and the number of teeth of the two wheels which engage the at least one drive are the same.

12. Drive as claimed in claim 1, wherein the wheels are arranged such that they each engage the same side of the at least one drive cable.

13. Drive as claimed in claim 12, wherein there are two drive cables which are driven in opposite directions, the wheels being arranged in between.

14. Drive as claimed in claim 13, wherein axes of rotation of the wheels and of the output pinion are located on a line.

15. Drive for displaceable motor vehicle part, comprising at least one drive cable and driven output pinion, the output pinion being in driving engagement with a drive unit which in driving unit with the at least one drive cable at least at two points, wherein the drive unit comprise at least two wheels, each of which is driven by the output pinion and which is in direct driving engagement with the at least one drive cable wherein the drive unit comprises two wheels which engage the at least one drive cable and the output pinion directly.

* * * * *